United States Patent
Rudolf et al.

(10) Patent No.: US 10,347,034 B2
(45) Date of Patent: Jul. 9, 2019

(54) OUT-OF-CORE POINT RENDERING WITH DYNAMIC SHAPES

(71) Applicant: Autodesk, Inc., San Rafael, CA (US)

(72) Inventors: David Timothy Rudolf, San Francisco, CA (US); Ronald Poelman, San Rafael, CA (US); Oytun Akman, Kensington, CA (US)

(73) Assignee: AUTODESK, INC., San Rafael, CA (US)

( * ) Notice: Subject to any disclaimer, the term of this patent is extended or adjusted under 35 U.S.C. 154(b) by 70 days.

(21) Appl. No.: 15/349,837

(22) Filed: Nov. 11, 2016

(65) Prior Publication Data

US 2018/0137671 A1    May 17, 2018

(51) Int. Cl.
| | |
|---|---|
| *G06T 1/20* | (2006.01) |
| *G06T 1/60* | (2006.01) |
| *G06T 15/08* | (2011.01) |
| *G06T 17/20* | (2006.01) |

(52) U.S. Cl.
CPC ............. *G06T 15/08* (2013.01); *G06T 1/20* (2013.01); *G06T 1/60* (2013.01); *G06T 17/20* (2013.01); *G06T 2210/56* (2013.01)

(58) Field of Classification Search
None
See application file for complete search history.

(56) References Cited

U.S. PATENT DOCUMENTS

| | | | | |
|---|---|---|---|---|
| 7,317,456 B1* | 1/2008 | Lee | .......................... | G06T 15/08 |
| | | | | 345/427 |
| 2002/0050992 A1* | 5/2002 | Deering | ................... | G06T 9/001 |
| | | | | 345/423 |
| 2014/0198097 A1* | 7/2014 | Evans | ..................... | G06T 17/00 |
| | | | | 345/419 |
| 2016/0035140 A1* | 2/2016 | Bickerstaff | ............. | A63F 13/26 |
| | | | | 345/633 |
| 2018/0047203 A1* | 2/2018 | Grossman | ............. | G06T 15/005 |

OTHER PUBLICATIONS

Pajarola, R., et al., "XSplat: External Memory Multiresolution Point Visualization", Proceedings IASED VIIP Conference, pp. 628-633, 2005.

(Continued)

*Primary Examiner* — Barry Drennan
*Assistant Examiner* — Khoa Vu
(74) *Attorney, Agent, or Firm* — Gates & Cooper LLP

(57) ABSTRACT

A method, apparatus, and system provides the ability to process and render a point cloud. The points in the point cloud are grouped into three-dimensional (3D) voxels. A position of each of the points is stored in the point data file. The position is with respect to a location of the point's corresponding 3D voxel. Surface normal data for a surface normal associated with each of the points is also stored in the point data file. The points are organized into levels of details (LODs). The point data file is provided to a graphics processing unit (GPU) that processes the point data file to render the point cloud. During rendering, a LOD is selected to determine the points in the point cloud to render.

20 Claims, 10 Drawing Sheets

(56) References Cited

OTHER PUBLICATIONS

Pintus, R., et al., "Real-time Rendering of Massive Unstructured Raw Point Clouds using Screen-space Operators", Proceedings of the 12th International Symposium on Virtual Reality, Archaeology and Cultural Heritage (VAST), 2011, pp. 105-112.
Rusinkiewicz, S., et al., "The QSplat Multiresolution Point Rendering System", Copyright 2000-2001. http://graphics.stanford.edu/software/qplat/.
Sainz, M., et al., "Points Reloaded: Point-Based Rendering Revisited", Proceedings of the First Eurographics Conference on Point-Based Graphics, The Eurographics Association, Jun. 2-4, 2004, pp. 121-128.
Potree website, postings from Apr. 15, 2014 to Sep. 13, 2015. http://potree.org/.
PointCloudViz website, Mar. 23, 2017. http://www.pointcloudviz.com/.
Pointools website, Mar. 23, 2017. https://www.bentley.com/en/products/product-line/reality-modeling-software/bentley-pointools?skid=CT_PRT_POINTOOLS_B.
Leica Cyclone website, Apr. 3, 2017. http://hds.leica-geosystems.com/en/leica-cyclone_6515.htm.
CloudCompare website, Apr. 3, 2017, http://www.danielgm.net/cc/.
LiDARview website, Apr. 3, 2017. http://lidarview.com/.

* cited by examiner

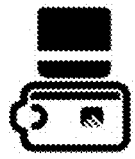
FIG. 9A Before Orthogonal Projection:
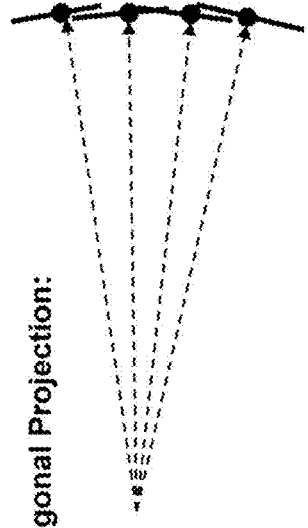
FIG. 9B After Orthogonal Projection:

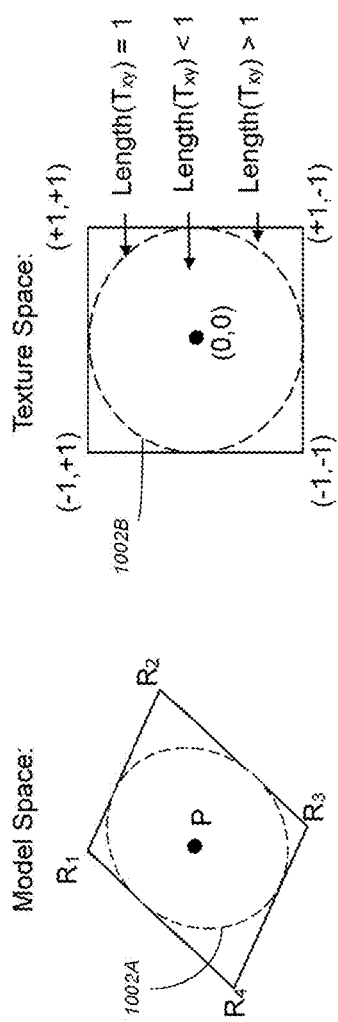
FIG. 10A
FIG. 10B
FIG. 11A
FIG. 11B

OUT-OF-CORE POINT RENDERING WITH DYNAMIC SHAPES

BACKGROUND OF THE INVENTION

1. Field of the Invention

The present invention relates generally to data/image processing/outputting, and in particular, to a method, apparatus, system, and article of manufacture for generating a rendering of a point cloud on a graphics processing unit (GPU).

2. Description of the Related Art (Note: This application references a number of different publications as indicated throughout the specification by reference names enclosed in brackets, e.g., [x]. A list of these different publications ordered according to these reference names can be found below in the section entitled "References." Each of these publications is incorporated by reference herein.)

When attempting to render billions of points in real-time, the bottleneck is to figure out which points are relevant for the screen space representation. Loading all of the points and overwriting the render buffer for every improved/better point results in a far from real-time performance. With points, there is little information that can help determine if it's relevant for screen space or not. A point cloud is entirely see-through because it does not represent a volume. For example, when rendering the point cloud, if one zooms in, the points may not fill up the display, and empty space may appear (i.e., one can see empty areas in between the points). Prior art systems may provide a slider control that allows the user to adjust the size of the points thereby filling in more/less space. However, if some point cloud areas are sparse and others are dense, there is no single setting that is visually appealing in both cases. To better understand such problems, a description of point clouds and prior art approaches may be useful.

Point clouds are often created by reality capture devices such as three-dimensional (3D) laser scanners that measure a large number of points (e.g., from thousands to many billions of points [3D coordinates]) on the surface of an object, and output a point cloud as a data file. The point cloud represents the visible surface of the object that has been scanned or digitized. With the increased usage of such reality capture devices, large point cloud data sets are more frequently created for consumption by design applications. Further, point cloud visualization and applications are increasingly important in design, especially due to the decrease in the price point of the technology.

Prior art methods may attempt to automatically determine how large to make points so that they fill in screen/space in a pleasing way. Most prior art approaches use the density of points in clusters to determine how large points should be rendered, and utilize a surface normal (that determines a direction that a surface is facing for each point in the point cloud) to orient the points to allow for more variation on one axis (when it is dense) and less variation along alternative axes (that are less dense). However, such prior art systems fail to provide a capability to quickly and efficiently render dynamic shapes in a visually appealing manner.

[Rusinkiewicz] generates oriented ellipses based on surface normals, and also vary the point size based on the level of detail (LOD) of the data. However, this LOD is determined by traversing a tree of nodes. Further, [Rusinkiewicz] generates their ellipse geometry on the central processing unit (CPU), meaning that they have to load an array of points from disk, expand them into geometric primitives (e.g., triangle strips), and then stream that complex geometry to the GPU (graphics processing unit) for rendering.

[Sainz] calculates ellipses from the point cloud, but assumes that each point is the same size in screen space. Similarly, [Pajarola] generates ellipses for different levels of detail, but does not mention any dynamic size calculations.

[Pintus] utilizes an image-based approach, where all points are rendered, and then the gaps are filled in the final image. This requires a second rendering pass that must check neighborhoods of the final image, so it will have some potential performance drawbacks, depending on the resolution of the final image.

In addition to the above, various other prior art applications may vary the size of points based on density and distance but do not change the shape of the point based on surface normal, or alternatively may require a constant point size (e.g., attached to a user control) with constant shapes.

In view of the above, one may note that the prior art fails to provide the ability to efficiently render a point cloud in a visually appealing manner regardless of the zoom-level.

SUMMARY OF THE INVENTION

Embodiments of the invention provide the ability to render unstructured point cloud data with high fidelity, yet with high performance. 3D point cloud data, including a surface normal of each point, is compactly encoded in a way that can be efficiently rendered by GPU hardware. Further each point is expanded into a deformed ellipse to improve rendering quality without impacting performance. The shape of each ellipse is derived from the surface normal of the point, relative to the rendering camera. The size of the ellipse varies based on the density of the data near that point. For performance, both the size and the shape of the ellipse is calculated on the GPU. The resulting rendered images provide the ability to fill gaps in sparse parts of the point cloud data, while still maintaining high-frequency detail in dense parts of a scene.

BRIEF DESCRIPTION OF THE DRAWINGS

Referring now to the drawings in which like reference numbers represent corresponding parts throughout:

FIGS. 9A and 9B illustrate a top view of four splats, both before and after the $R_i$ coordinates are projected to face toward the camera in accordance with one or more embodiments of the invention;

FIGS. 10A and 10B illustrate model space and texture space, respectively, with an ellipse in which pixels are drawn in accordance with one or more embodiments of the invention;

FIGS. 11A and 11B illustrate a comparison of rendering camera-facing large points (i.e., squares) with surface-oriented ellipses in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention provide the ability to render point clouds on modern GPU hardware as efficiently and accurately as possible, in a visually pleasing way. There are two primary components: a compact representation of point data, and an out-of-core method for generating a surface representation of each point on the GPU. In addition, use is made of how dense the points are in the neighborhood around the current point in order to determine the size of an ellipse that is drawn.

Hardware Environment

Figure 1:
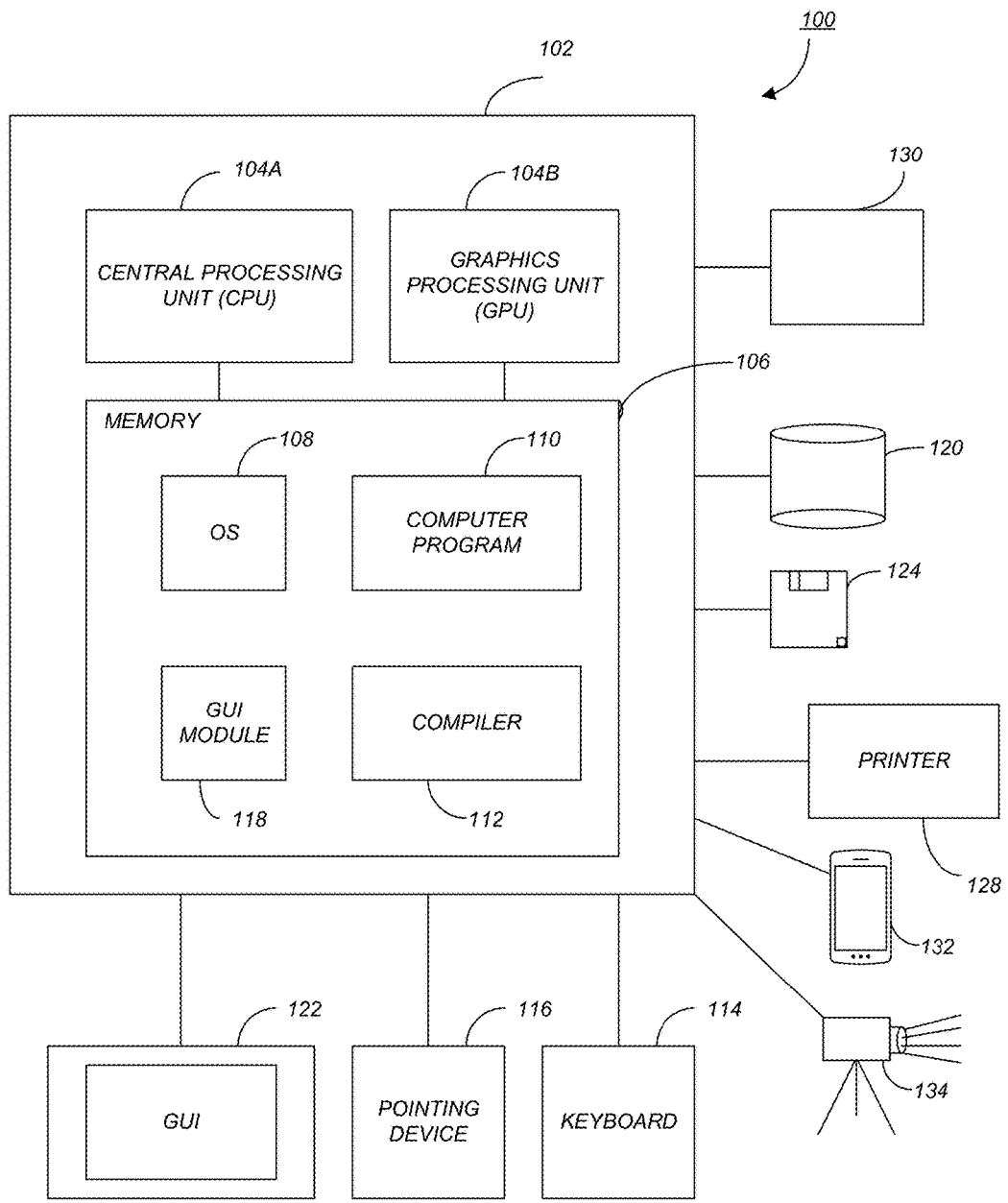
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a central processing unit (CPU) 104A (also referred to as a general purpose hardware processor) and/or a graphics processing unit (GPU) 104B (also referred to as a special purpose hardware processor) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD™, NOOK™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 may be coupled to, and/or integrated with, a laser scanning device 134. Such a laser scanning device 134 is configured to scan an object or urban environment and obtain a digital representative of such an object/environment in the form of point cloud data that may be processed by the computer 102. Exemplary laser scanning devices 134 include terrestrial scanners (e.g. operated by hand or attached to a mobile device such as an automobile) as well as satellite based scanners.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results. The GPU 104B is configured to rapidly manipulate and alter memory to accelerate the creation of images in a frame buffer intended for output to a display. In particular, GPUs 104B are very efficient at manipulating computer graphics and image processing in a highly parallel structure that makes them more effective than general purpose CPUs 104A when processing large blocks of data in parallel. A GPU 104B may be present on a video card, or can be embedded on a motherboard, or may be part of a mobile device (e.g., a cellular phone).

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104A/104B from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors. Output of our invention may also be to off-line files, such as JPEG (joint photographic experts group) images or MPEG (motion pictures experts group) video files, to be viewed later or transmitted over networks for later viewing or sharing with others.

In one or more embodiments, the display 122 is integrated with/into the computer 102 and comprises a multi-touch device having a touch sensing surface (e.g., track pad or touch screen) with the ability to recognize the presence of two or more points of contact with the surface. Examples of multi-touch devices include mobile devices (e.g., IPHONE™, NEXUS S™, DROID™ devices, etc.), tablet computers (e.g., IPAD™, HP TOUCHPAD™), portable/handheld game/music/video player/console devices (e.g., IPOD TOUCH™, MP3 players, NINTENDO 3DS™ PLAYSTATION PORTABLE™, etc.), touch tables, and walls (e.g., where an image is projected through acrylic and/or glass, and the image is then backlit with LEDs).

Some or all of the operations performed by the computer 102 according to the computer program 110 instructions may be implemented in the GPU 104B and a combination of the CPU 104A and the GPU 104B. In such an embodiment, some or all of the computer program 110 instructions may be implemented via firmware instructions stored in a read only memory (ROM), a programmable read only memory (PROM) or flash memory within the GPU 104B or in memory 106. The GPU 104B may also be hardwired through circuit design to perform some or all of the operations to implement the present invention. Further, the GPU 104B may be a hybrid processor, which includes dedicated circuitry for performing a subset of functions, and other circuits for performing more general functions such as responding to computer program 110 instructions. In one embodiment, the GPU 104B is an application specific integrated circuit (ASIC).

The computer 102 may also implement a compiler 112 that allows an application program 110 written in a programming language such as COBOL, C, C++, ASSEMBLY, SQL, PYTHON, PROLOG, MATLAB, RUBY, RAILS, HASKELL, or other language to be translated into processor 104A/104B readable code. Alternatively, the compiler 112 may be an interpreter that executes instructions/source code directly, translates source code into an intermediate representation that is executed, or that executes stored precompiled code. Such source code may be written in a variety of programming languages such AS JAVA™ JAVASCRIPT™, PERL™ BASIC™, etc. After completion, the application or computer program 110 accesses and manipulates data accepted from I/O devices and stored in the memory 106 of the computer 102 using the relationships and logic that were generated using the compiler 112. To make use of GPU 104B hardware, programming languages such as GLSL (OpenGL Shading Language), HLSL (High Level Shading Language), and CG (C for Graphics) can be used to specify shader programs for the GPU at a high level, and which can be compiled by the video driver into machine code that is executed by the GPU.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
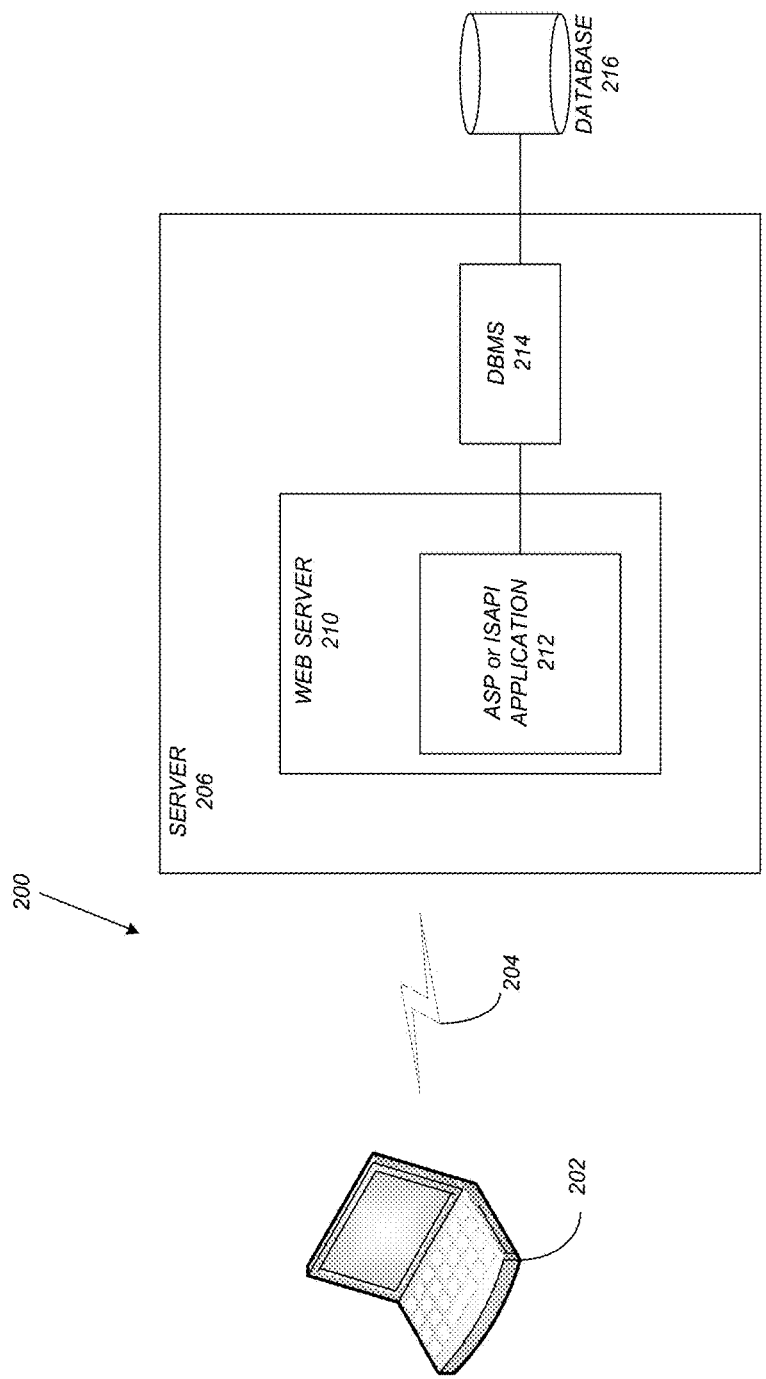
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations, and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network 204 may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™ MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 202-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 102, 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 102, 202 and 206.

Software Embodiments

Embodiments of the invention are implemented as a software application on a client 202 or server computer 206. Further, as described above, the client 202 or server computer 206 may comprise a thin client device or a portable device that has a multi-touch-based display and that may comprise (or may be coupled to or receive data from) a 3D laser scanning device 134.

As described above, there are two primary components of embodiments of the invention: a compact representation of the point data, and an out-of-core method for generating a surface representation of each point on the GPU. The description below will provide details for each of these components.

Efficient Representation of Point Data

Since point clouds typically have large amounts of data, the main bottleneck for performance is the interface between main memory 106 and the GPU 104B. With this in mind, embodiments of the invention have a representation of a point that fits its position, color, surface normal, intensity (i.e., scanner 134 return brightness), as well as other flag properties. These all can be compactly stored in a 12-byte structure using a compact file format referred to herein as RCS (recap scan) format. The point representation data is sufficient to describe all of the rendering properties that may be needed. In addition, embodiments of the invention provide the ability to extract high-precision positions and surface normals from the point structure.

Figure 3:
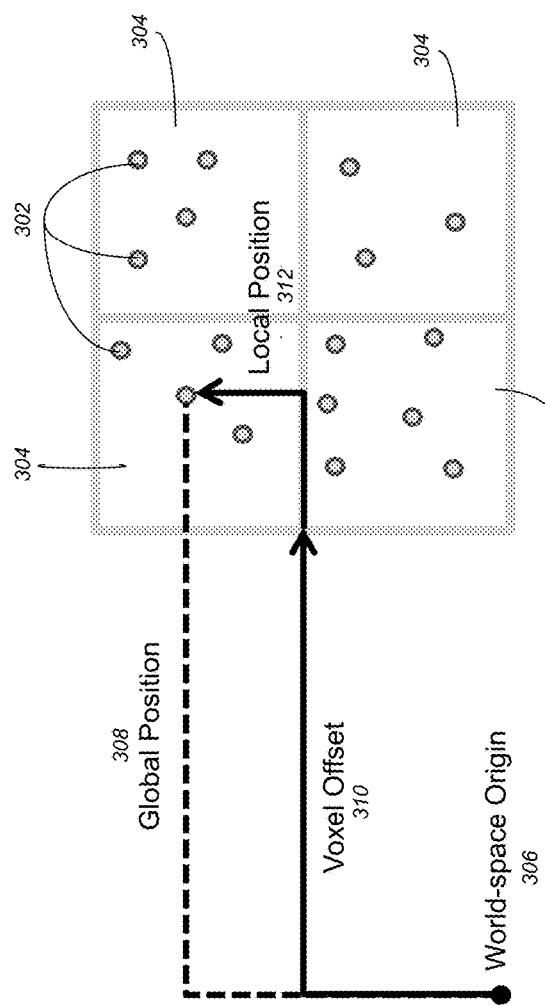
FIG. 3 illustrates the representation of position data in accordance with one or more embodiments of the invention.

For position data, points are grouped into large 3D voxels, and the position of each point is stored with respect to the location of that voxel. This way, high-precision positions can be represented with fewer bits of data. In an exemplary implementation, 36 bits may be used for each point (12 bits for each x, y, and z dimension, respectively). FIG. 3 illustrates the representation of position data in accordance with one or more embodiments of the invention. Points 302 are divided into grid cells/bins 304. From the world-space origin 306, the global position 308 of each point 302 may be determined. However, embodiments of the invention convert the points' global positions 308 into smaller vectors in the local space of each voxel. In other words, each grid cell/bin 304 represents a voxel and there is an offset 310 from the global position to each voxel (and/or to a set of voxels—e.g., the offset may point to the lower left corner of the set of voxels/cells 304). Thereafter, the local position 312 of each point 302 (i.e., relative to/from the voxel offset 310) may be determined. Accordingly, there is a set of smaller vectors (e.g., the voxel offset 310 followed by vectors relative thereto) that represents the position of each point 302. This position information may be stored in the structure representing the point cloud.

Figure 4:
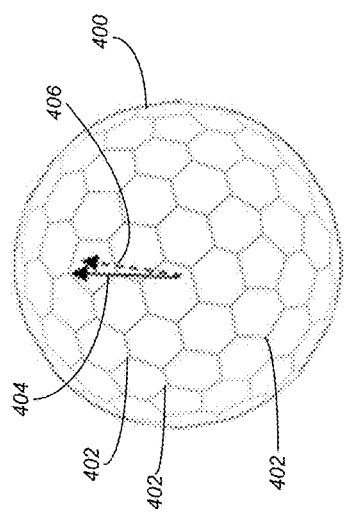
FIG. 4 illustrates an original (uncompressed) surface normal vector, and the sphere vertex that is closest to that normal in accordance with one or more embodiments of the invention.

In addition, embodiments of the invention store a compressed surface normal with each point. A unit sphere containing vectors may be used to determine such surface normal. For example, conceptually, a unit sphere can be placed around each point (the point's coordinate at the sphere's center). The sphere can then be tessellated to have a uniform distribution of vertices across its surface, where each vertex is a direction that the point could be facing. In particular, FIG. 4 illustrates an original (uncompressed) surface normal vector 404, and the sphere vertex 406 that is closest to that normal in accordance with one or more embodiments of the invention. A mesh of vertices 402 that uniformly covers a unit sphere 400 is precomputed. In other words, a unit sphere 400 is subdivided by uniform-ish vertices 402. Each vertex 402 may be enumerated by assigning an integer ID to each vertex 402 on that sphere 400. A look-up table of IDs and the vertex 402 on the sphere 400 (that the IDs represent) is constructed. In particular, the surface normal 404 is compressed as the ID of its closest vertex. The normal 404 is decompressed as its vertex 402. The look-up table is from IDs to vertices 402. When indexing the points into an RCS file, the ID of the vertex 402 that is closest to the actual surface normal 404 is stored. In other words, the vertices 402 may be stored as a GPU texture that is used at render time (e.g., the vertex shader fetches each point's normal from the texture—see detailed description below). Accordingly, numbers/integers are assigned to the vertices 402, a vertex 402 that is closest to a surface normal 404 is determined, and then the integer corresponding to that vertex 402 is stored.

When reading the RCS file, one simply uses the ID in the look-up table to find the actual surface normal 404. This compression scheme is lossy, in that multiple input normals 404 will get mapped to the same ID. However, the amount of loss goes down as the density of vertices on the sphere is increased, and thus the number of IDs in the look-up table increases. One may find that a 10-bit ID is good enough for rendering points, as it facilitates 1024 possible surface normals 404.

Finally, points are organized into levels of detail (LODs). One does not need to draw all points in a voxel because the voxel itself may occupy only a small number of pixels on the screen. The number of points to draw is determined based on how much screen space the voxels occupy. The process of determining what LOD to use will be described in further detail below. For now, a description of the method of assembling the points into LODs in a manner that is efficient for GPU rendering will be set forth.

Figure 5:
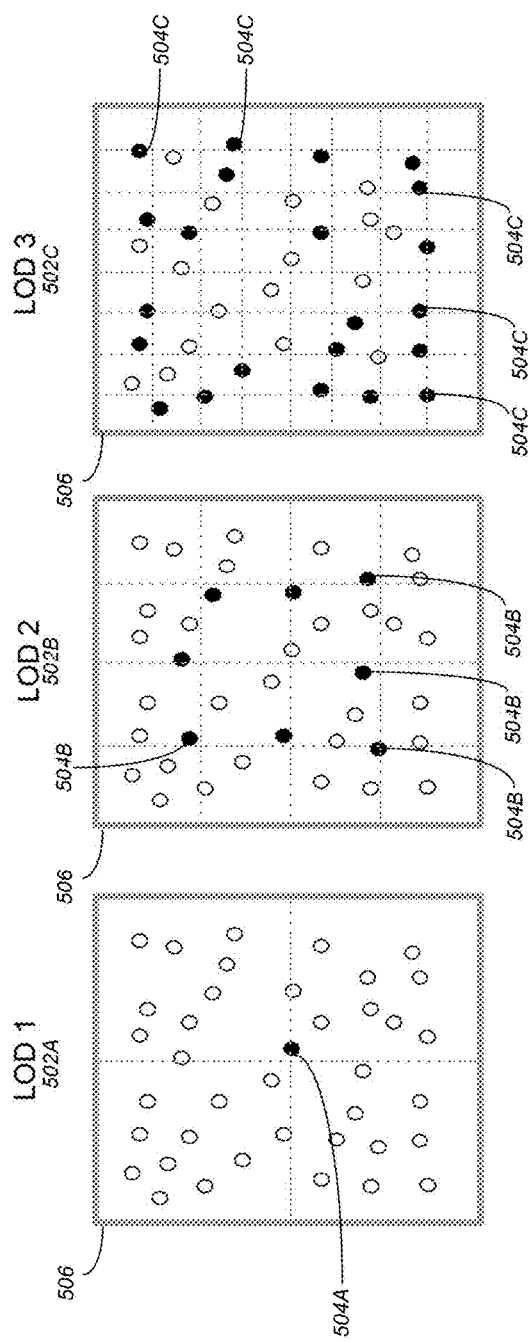
FIG. 5 illustrates spatially the construction of LODs in accordance with one or more embodiments of the invention.

FIG. 5 illustrates spatially the construction of LODs in accordance with one or more embodiments of the invention. When building LODs 502A-502C (referred to collectively as LODs 502), one wants to choose the most important points to be at the highest LODs 502. How those important points are chosen may depend on the desired result. In one or more embodiments, points that cover the screen space as best as possible are selected. One can start (i.e., at LOD 1 502A) by picking a single point 504A that is closest to the center of the voxel 506. Then, the voxel 506 is subdivided into quadrants (e.g., for 2D) or octants (e.g., for 3D) (FIG. 5 illustrates quadrants via the dashed lines), and the points 504B that are closest to the center of those quadrants are selected as the second LOD 502B. Each quadrant (or octant) is recursively subdivided to get each subsequent level of the LOD (e.g., see points 504C). Accordingly, the criteria for picking points 504 may be geometric (i.e., based on the geometric center of each quadrant/octant). Alternatively, other criteria may be used (e.g., average color, distance, etc.). Embodiments of the invention are not intended to be limited to any particular selection criteria.

Figure 6:
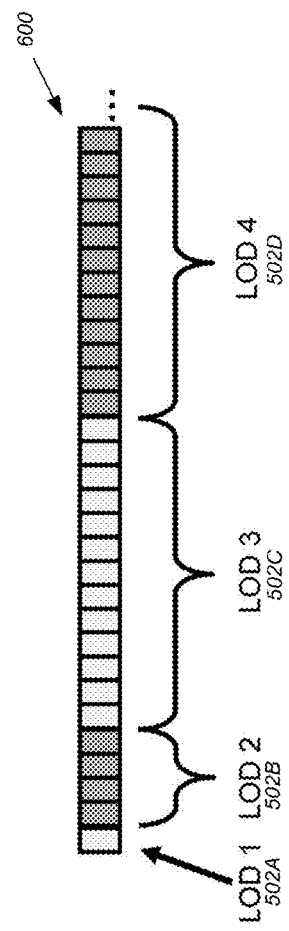
FIG. 6 illustrates an exemplary array for storing the LODs in accordance with one or more embodiments of the invention.

Due to the recursive nature of the LODs, one may be tempted to organize the LODs in a tree structure. However, such an organizational structure may be bad for rendering performance. In this regard, to draw the points, one would have to traverse each node of the tree. Instead, the points are arranged in an array, where they are sorted by the LOD to which they belong to. This way, when rendering a particular LOD, one can send all the points that are in that LOD plus the ones in higher LODs using a single memory copy. FIG. 6 illustrates an exemplary array for storing the LODs in accordance with one or more embodiments of the invention. As illustrated, LOD 1 502A is stored in the beginning of the point array 600, followed by the points in LOD 2 502B, LOD 3 502C, LOD 4 502D, etc.

An array of indices is maintained and identifies where each LOD starts in the point array 600. Thus, given a LOD to render, one merely needs to access the array of indices to determine where in the point array 600 the memory copy operation should commence from. In view of the above, the following values are stored for each voxel:

3D offset;
An array of local points 504, sorted by their LOD 502, where each point has a surface normal ID, a color, an intensity, and other flag values; and
Indices of the first local point 504 (in the above array 600) for each LOD 502.

With this storage structure, all the information needed to render the point cloud is maintained (e.g., there is one look-up table for all normal, and a normal ID is stored with each point).

Out-of-Core Processing on the GPU

The GPU is also given the look-up table that maps from surface normal IDs to actual 3D surface directions. This look-up table is encoded as a 1D texture, and sent to the GPU once before any points are rendered. Combined with this look-up table, the point data structure completely describes each point, and the GPU can generate more complex geometry to better give each point the appearance of the surface that it represents. This can be done in parallel to other operations on the CPU. As well, each point is independent of all others, and so they can be processed in parallel on the GPU itself. Embodiments of the invention make use of three main parts of modern GPU architectures: vertex shaders that process individual points, geometry shaders that can generate sets of triangles from a single point, and fragment shaders that manipulate individual pixels of the rendered image.

In one or more embodiments, the vertex shader is merely responsible for decompressing information from the compact point structures. It generates a 3D vector for the surface normal ID. It also creates a double-precision 3D position for the point from its 36-bit offset and the position of its containing voxel (which is set as a shader parameter). The vertex shader also decompresses color and flag values. Lastly, the vertex shader also computes the visibility of the point. Each point may be flagged as invisible because it belongs to a region that the user has decided to hide, or it is inside some filter volume. In either case, the vertex shader will mark the point to be deleted by later stages of the GPU pipeline.

Figure 7:
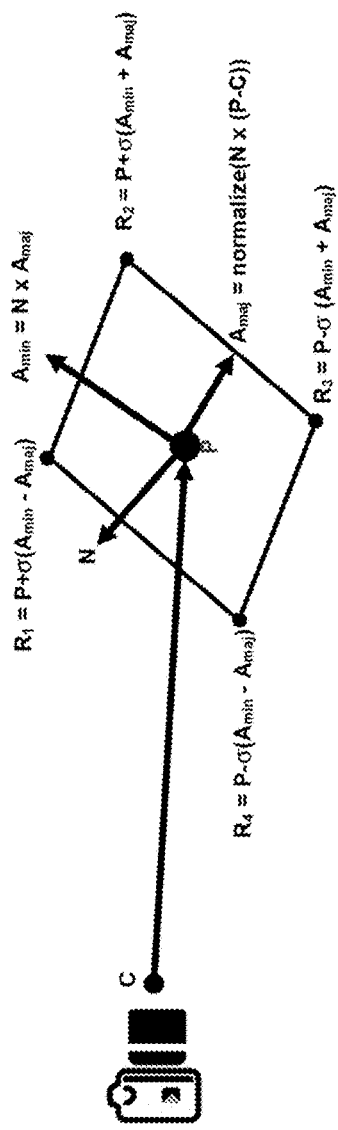
FIG. 7 conceptually illustrates how a point is expanded into constituent parts in accordance with one or more embodiments of the invention.

FIG. 7 conceptually illustrates how a point is expanded into constituent parts in accordance with one or more embodiments of the invention. The geometry shader will actually generate a rectangle in screen-space that is to be rendered by the fragment shader. It does so by considering the ray that goes from the camera (C) to the point (P), and the surface normal (N). It then computes the major axis ($A_{maj}$) of the rectangle to be orthogonal to (P-C) and N, using the cross product of those two vectors. Finally, the minor axis ($A_{min}$) of the rectangle is computed to be the cross product between the $A_{maj}$ and N. This gives a coordinate system in which to describe the orientation of the rectangle that is rendered for the point.

To get the actual shape of the rectangle, the angle between the camera's viewing direction and the surface normal is considered. If C is the camera's position, P is the point's location, and N is the surface normal, then this angle α can be found by solving $$\cos(\alpha) = \text{normalize}(P-C) \cdot N$$

Where ·0 is the standard inner product between two vectors.

One doesn't need to find α directly, but can use its cosine to give the proportion of the rectangle's shape along the minor axis ($A_{min}$) relative to the major axis ($A_{maj}$).

One can also compute the relative size of the rectangle based on the density of points around it. When rendering each voxel of points, a level of detail (LOD) to display is chosen, which determines how many points in the voxel to be drawn. For example, if the voxel occupies a small portion of the final image's screen space (in pixels), then there is no need to draw all the points in that voxel. In this case, a lower LOD can be selected, that translates to a smaller subset of the voxel's points. A smaller LOD may also be chosen because all of the points for that voxel may not yet have been loaded from disk.

Figure 8:
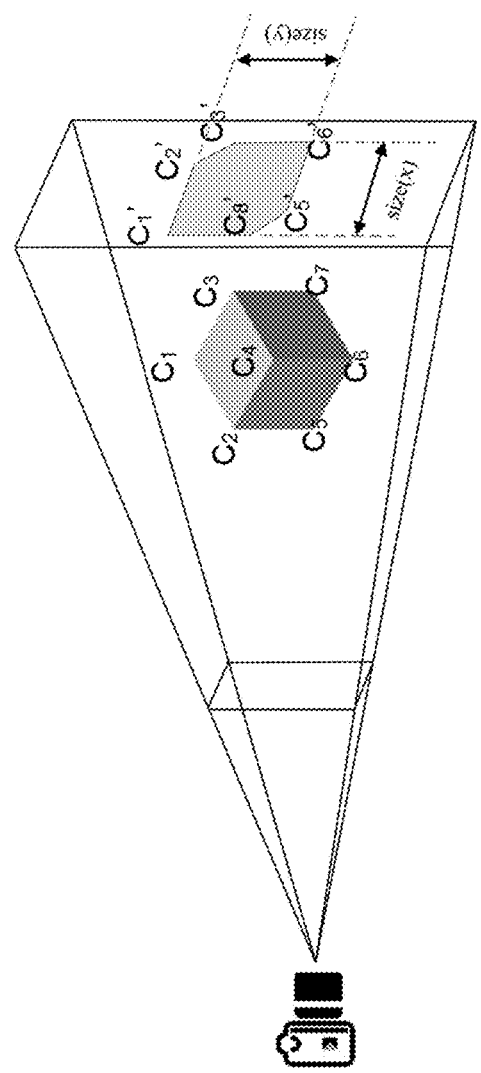
FIG. 8 illustrates the elements used to calculate the desired LOD (or LOD value) in accordance with one or more embodiments of the invention.

FIG. 8 illustrates the elements used to calculate the desired LOD (or LOD value) in accordance with one or more embodiments of the invention. The LOD value is used to determine how dense the data is in that voxel's part of the image, and thus how large of a rectangle should be used to represent each point. To compute this scale factor, one first needs to know the size of the voxel, in screen space. The voxel size is determined by taking each of the eight 3D corners $C_i$ of the voxel bounding box and transforming them into the normalized device coordinates of the camera, like so:

$$C_i' = P * V * M * C_i$$

Where P, V, and M are the usual projection, view, and model matrices that are standard in modern computer graphics. Based on the points' locations, one can determine the number of pixels in both height and width that the voxel occupies in screen space. More specifically, the 2D screen-space size of the voxel is computed as the difference between min and max values for the transformed points $C_i'$:

$$\text{size}(x) = \max(C_i' \cdot x) - \min(C_i' \cdot x)$$

$$\text{size}(y) = \max(C_i' \cdot y) - \min(C_i' \cdot y)$$

In the above equations, x and y are unit vectors along the X and Y axes. Based on the 2D screen space size, one can determine how many LODs are needed to fill the space. For example, the LOD to use when displaying the voxel is computed as:

$$\text{LOD}_{des} = \log_2\{\max(\text{size}(x), \text{size}(y))\}$$

However, the resolution of the scan might be so low that the maximum LOD that is stored/available might be lower than the desired LOD. In this case, it is desirable to draw larger ellipses for each point. The difference between desired and max LODs is calculated as:

$$\Delta\text{LOD} = \max(1, \text{LOD}_{des} - \text{LOD}_{max})$$

An LOD size factor σ is computed to be:

$$\sigma = 1/(2^{\Delta LOD})$$

For practical reasons, the size of σ may be limited. Otherwise, splats in sparse parts of the model may cover huge portions of the screen. The exact limit to use can be a variable parameter of the system. In one or more embodiments, values near 16 pixels have been found to be a good limit. If a limit is not used, then some points that are near the camera but in sparse parts of the scan might take up huge parts of the screen. It is expensive to render large splats for such points, and it also obscures large portions of the model.

The size factor may be applied to axes $A_{min}$ and $A_{maj}$ to get the four corners $R_1 \ldots R_4$ of the rectangle that are rendered. Each point may be computed as:

$$R_1 = P + \sigma(A_{maj} + A_{min})$$

$$R_2 = P + \sigma(A_{maj} - A_{min})$$

$$R_3 = P - \sigma(A_{maj} + A_{min})$$

$$R_4 = P - \sigma(A_{maj} - A_{min})$$

The above computations provide the position of the rectangle points in view-space, but one still needs to transform them into screen-space. When transformed, points that are potentially at different depth values may result, which will mean that rectangles that are close together could intersect each other. This gives a very cluttered and displeasing appearance to the final image, since some rectangles may be poking through others. To fix the problem, the depth value for the point P itself may be computed, and then all four corners $R_i$ of the rectangle are assigned that same depth value. This effectively makes the rectangle orthogonal to the direction of the camera. Doing so makes the final rendered image smoother. FIGS. 9A and 9B illustrate a top view of four splats, both before and after the $R_i$ coordinates are projected to have the same depth distance in accordance with one or more embodiments of the invention. In particular, FIG. 9A illustrates a top view of splats before an orthogonal projection, while FIG. 9B illustrates a top view of splats after the orthogonal projection.

Note that this projection is not the same as rotating the splats toward the camera. If one were to rotate the splats toward the camera, then their size in model space would be the same, whereas in screen space the size would increase. Instead, projecting the points ensures that the size in screen space is the same.

The final stage of rendering is to use the GPU's fragment processors to smooth the edges of the rectangle. FIGS. 10A and 10B illustrate model space and texture space, respectively, with an ellipse 1002A/1002B in which pixels are drawn in accordance with one or more embodiments of the invention. The ellipse 1002 shows pixels drawn, i.e., where length$(T_{xy}) \leq 1$. $R_1$-$R_4$ illustrate the four corners of the rectangle in 3D. The rectangle of FIG. 10A is deformed into a regular square (i.e., Texture Space $T_{xy}$ as illustrated in FIG. 10B. In one or more embodiments, $R_1$ maps to $T_{-1,+1}$, $R_2$ maps to $T_{+1,+1}$, $R_3$ maps to $T+_{+1,-1}$, and $R_4$ maps to $T_{-1,-1}$.

Thus, the GPU renders an ellipse 1002A instead of a rectangle, by defining the texture coordinate that corresponds to each rectangle corner $R_i$. Those texture coordinates are defined as:

$$T_1 = (1,1)$$

$$T_2 = (1,-1)$$

$$T_3 = -(1,1)$$

$$T_4 = -(1,-1)$$

This gives every pixel on the rectangle/quadrilateral of FIG. 10A, a texture coordinate $T_{xy}$ between −1 and +1 (i.e., from FIG. 10B). One can then decide if a pixel should be turned on based on its distance in texture-space from the center (i.e., P(0,0)). If the length of $T_{xy}$ is greater than one, then the pixel is outside the ellipse 1002, and should not be rendered. Otherwise, the pixel is drawn. Thus, as illustrated in FIG. 10B, if the pixel is within the circle 1002B/ellipse 1002A having a length of $T_{xy}$ less than 1, it is rendered, otherwise it is not rendered.

Results

FIGS. 11A and 11B illustrate a comparison of rendering camera-facing large points (i.e., squares) with surface-oriented ellipses in accordance with one or more embodiments of the invention. FIG. 11A illustrates a rendering using constant-shaped squares, while FIG. 11B illustrates a rendering with normal-deformed ellipses. Notice that surface details are more evident with the ellipses (FIG. 11B). In particular, the details can be more easily seen in the portion 1102 of the wall that extends beyond the main church 1104.

Figure 12A:
FIGS. 12A, 12B, and 12C illustrate another example comparison of rendering camera-facing large points with small, large, and dynamic ellipse sizes in accordance with one or more embodiments of the invention.
Figure 12B:
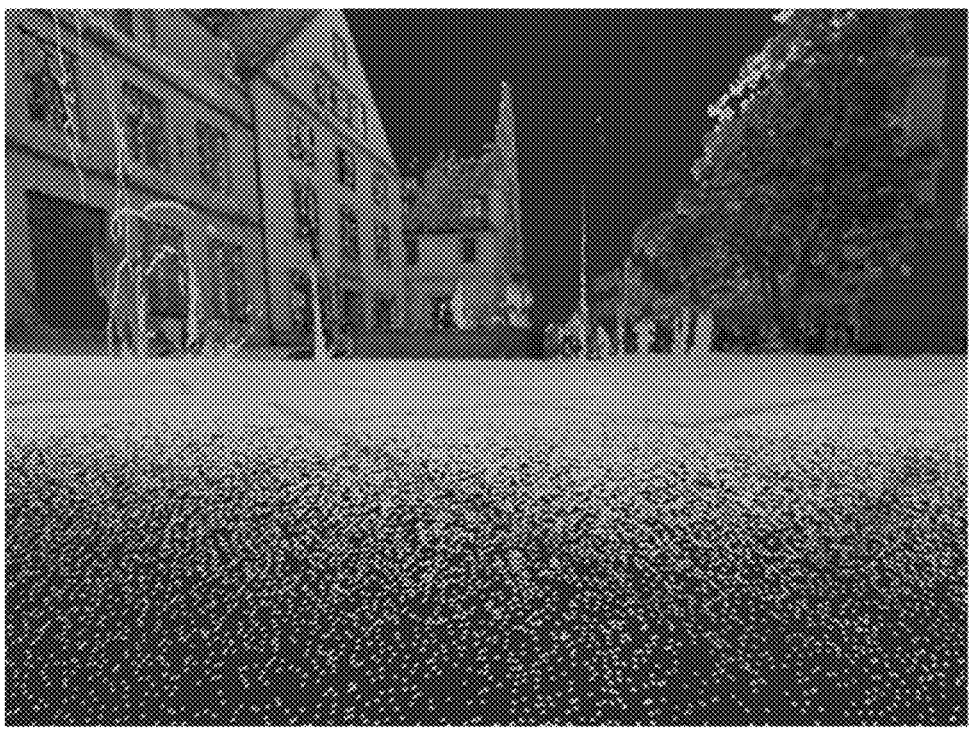
Figure 12C:

FIGS. 12A, 12B, and 12C illustrate another example comparison of rendering camera-facing large points with small, large, and dynamic ellipse sizes in accordance with one or more embodiments of the invention. FIG. 12A shows a rendering with small constant-sized ellipses. Notice the high detail with further objects, but large open spaces between points in foreground objects. The point size can be increased (e.g., using large constant-sized ellipses), as with the image illustrated in FIG. 12B. This will fill in more empty space in foreground objects, but will also obscure some of the detail in background objects. FIG. 12C illustrates dynamic-sizing ellipses used based on the methodology described above. Notice that the details of background objects remain while foreground objects have more of their gaps filled in.

Logical Flow

Figure 13:
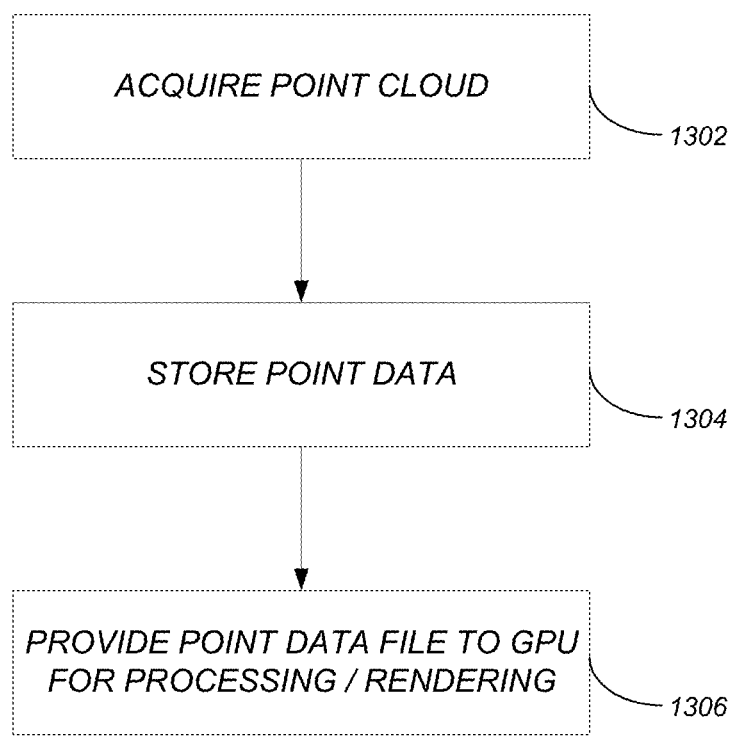
FIG. 13 illustrates the logical flow for processing a point cloud in accordance with one or more embodiments of the invention.

FIG. 13 illustrates the logical flow for processing a point cloud in accordance with one or more embodiments of the invention.

At step 1302, a point cloud (comprising points) is acquired.

At step 1304, the point data for the points is stored in a point data file. To store the point data, the points are first grouped into 3D voxels and each point has a corresponding 3D voxel. Next, the position of each of the points (with respect to a location of the point's corresponding 3D voxel) is stored in the point data file. Surface normal data for a surface normal associated with each of the points is also stored in the point data file. The points are organized into LODs.

At step 1306, the point data file is provided to a GPU that processes the point data file to render the point cloud. The LOD is selected to determine the points in the point cloud to render.

To store the position in step 1304, a global position of each point is converted into vectors in a local space of each 3D voxel. The stored position is based on these vectors.

To store the surface normal at step 1304, a mesh of vertices that uniformly covers a unit sphere is computed. An integer ID is assigned to each of the vertices on the unit sphere. A look-up table is constructed for the assigned integer IDs and corresponding vertices. This same look-up table is used for all points. A vertex that is closest to the surface normal is determined, and the corresponding integer ID is stored.

Once stored, the point data file may be read, and the look-up can be used to find the determined vertex, that is then used to determine the surface normal that is closest.

To organize the points in step 1304, a first point from the point cloud for a first LOD is selected that is closest to the center of its corresponding 3D voxel. Thereafter, recursively, for each LOD, the 3D voxel is subdivided into subdivisions and points are selected that are closest to the centers of the subdivisions. The selected points are then arranged in a point array that is sorted by the LOD to which the selected points belong. An index array is maintained that identifies the indices at which each LOD starts in the point array.

Step 1306 may include processing by three components of the GPU. A vertex shader decompresses the point data in/from the point data file. A geometry shader generates a rectangle in screen-space based on the decompressed point data. A fragment processor smooths the edges of the rectangle and renders the selected points.

The vertex shader decompresses the data for each point by generating a 3D vector for the surface normal associated with the point, creating a 3D position, given a position of the corresponding 3D voxel for the point, decompressing color and flag values, and computing a visibility of each point.

The geometry shader generates the rectangle by computing a major axis that is orthogonal to each point's associated surface normal, a minor axis that is a cross product of the major axis and the surface normal, determining an angle between a camera's viewing direction and the surface normal (e.g., based on a cosine or standard inner product between two vectors), and computes a relative size of the rectangle based on a density of points around the rectangle. To compute the relative size, for each voxel, each of eight 3D corners of a bounding box of the 3D voxel is transformed into normalized device coordinates of the screen. A 2D screen-space size of the 3D voxel is then computed as a difference between minimum and maximum values for the transformed points for both the X and Y axes. Based on the 2D screen space size, the number of LODs that are needed to fill the 2D screen-space size is determined (e.g., by computing the log base 2).

Further, the geometry shader may also compute a difference between a desired LOD and a maximum available LOD. A LOD size factor σ is computed as $\sigma=1/(2^{\Delta LOD})$.

The size factor may be limited and then applied to the major and minor axis to get the four corners of the rectangle that are computed as described above. Further, a depth value of each point may be computed and then assigned to the four corners, resulting in a projection of the four corners so that their rectangle faces toward the camera.

The fragment processor may render an ellipse instead of a rectangle by defining a texture coordinate that corresponds to each rectangle corner, and determining if a pixel should be turned on based on its distance in texture space.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Rusinkiewicz] Szymon Risinkiewwicz, "The QSplat Multiresolution Point Rendering System" (2001), from graphics.stanford.edu/software/qplat/;
[Sainz] Miguel Sainz, Renato Pajarola, and Roberto Lario, "Points Reloaded: Point-Based Rendering Revisited", Proceedings of the First Eurographics Conference on Point-Based Graphics, pages 121-128 (Jun. 2-4, 2004);
[Pajarola] Renato Pajarola, Miguel Sainz, and Roberto Lario, "XSplat: External Memory Multiresolution Point Visualization", Proceedings IASED VIIP Conference, pages 628-633 (2005); and
[Pintus] Ruggero Pintus, Enrico Gobbetti, and Marco Agus, "Real-time Rendering of Massive Unstructured Raw Point Clouds using Screen-space Operators", Proceedings of the 12$^{th}$ International conference on Virtual Reality, Archaeology and Cultural Heritage (VAST), pages 105-112 (2011).

What is claimed is:

1. A computer-implemented method for processing a point cloud, comprising:
   (a) acquiring the point cloud comprising points;
   (b) encoding and storing, in a point data file, point data for the points by:
      (1) grouping the points into three-dimensional (3D) voxels, wherein each of the points has a corresponding 3D voxel;
      (2) storing, in the point data file, a position of each of the points, wherein the position is with respect to a location of the point's corresponding 3D voxel;
      (3) storing, in the point data file, surface normal data for a surface normal vector associated with each of the points; and
      (4) organizing the points into levels of details (LODs);
   (c) providing the point data file to a graphics processing unit (GPU) that processes the point data file to render the point cloud, wherein:
      (1) a LOD is selected to determine the points in the point cloud to render; and
      (2) the position and the surface normal data are used to render each of the points in the selected LOD;
   (d) a vertex shader on the GPU decompressing the point data in the point data file;
   (e) a geometry shader on the GPU generating a rectangle in screen-space, based on the decompressed point data, that is to be rendered by a fragment shader, wherein the geometry shader generates the rectangle by:
      (1) computing a major axis ($A_{maj}$) of a rectangle that is orthogonal to each point (P) and the surface normal (N) associated with the point (P);
      (2) computing a minor axis ($A_{min}$) of the rectangle as a cross product between $A_{maj}$) and N;
      (3) determining an angle (α) between a camera (C)'s viewing direction and N as $\cos(\alpha)=\text{normalize}(P-C)\cdot N;$ where · is a standard inner product between two vectors; and
      (4) computing a relative size of the rectangle based on a density of points around the rectangle; and
   (f) a fragment processor on the GPU smoothing edges of the rectangle.

2. The computer-implemented method of claim 1, wherein the storing the position further comprises:

converting a global position of each point into vectors in a local space of each 3D voxel, wherein the stored position for each of the points is based on the vectors.

3. The computer-implemented method of claim 1, wherein the storing the surface normal data further comprises:
   computing a mesh of vertices that uniformly covers a unit sphere;
   assigning an integer identification (ID) to each of the vertices on the unit sphere;
   constructing a look-up table of the assigned integer IDs and corresponding vertices;
   determining a vertex from the mesh of vertices that is closest to the surface normal; and
   storing the integer ID corresponding to the determined vertex.

4. The computer-implemented method of claim 3, further comprising:
   reading the point data file;
   looking up the integer ID in the look-up table to find the determined vertex; and
   utilizing the determined vertex as an output surface normal that is rendered.

5. The computer-implemented method of claim 1, wherein the organizing comprises:
   picking, for a first LOD, a first point from the point cloud, wherein the first point is the point that is closest to a center of the corresponding 3D voxel;
   recursively, for each LOD:
      subdividing the 3D voxel into subdivisions;
      selecting points from the point cloud that are closest to centers of the subdivisions;
   arranging the selected points in a point array that is sorted by the LOD to which the selected points belong; and
   maintaining an index array that identifies indices at which each LOD starts in the point array.

6. The computer-implemented method of claim 1, wherein the vertex shader decompresses by:
   for each point:
      generating a 3D vector for the surface normal associated with the point;
      creating a 3D position;
      creating a position of the corresponding 3D voxel for the point;
      decompressing color and flag values; and
      computing a visibility of each point.

7. The computer-implemented method of claim 1, wherein the computing the relative size comprises:
   for each 3D voxel:
      transforming each of eight 3D corners $C_i$ of a bounding box of the 3D voxel (V), into normalized device coordinates of the camera (C) as:

$C_i'=P*V*M*C_i$ wherein, P, V, and M comprise a projection matrix, a view matrix, and a model matrix;
      computing a 2D screen-space size of the 3D voxel as a difference between minimum and maximum values for the transformed points $C_i'$;

$size(x)=\max(C_i'\cdot x)-\min(C_i'\cdot x);$ $size(y)=\max(C_i'\cdot y)-\min(C_i'\cdot y);$ wherein x and y are unit vectors along the X and Y axes;
      based on the 2D screen space size, determining how many LODs are needed to fill the 2D screen-space size, as:

$LOD_{des}=\log_2\{\max(size(x), size(y))\}.$

8. The computer-implemented method of claim 7, further comprising:
   computing a difference between a desired LOD and a maximum LOD of each 3D voxel as:

$\Delta LOD=\max(1, LOD_{des}-LOD_{max});$ computing a LOD size factor σ as:

$\sigma=1/(2^{\Delta LOD});$ limiting a size of σ;
   applying the size factor σ to axes $A_{min}$ and $A_{maj}$ to get the four corners $R_1 \ldots R_4$ of the rectangle, wherein the four corners of the rectangle are computed as:

$R_1=P+\sigma(A_{maj}+A_{min})$ $R_2=P+\sigma(A_{maj}-A_{min})$ $R_3=P-\sigma(A_{maj}+A_{min})$ $R_4=P-\sigma(A_{maj}-A_{min}).$ 9. The computer-implemented method of claim 8, further comprising:
   computing a depth value for the point P;
   assigning the depth value to the four corners of the rectangle, wherein the assigning projects the four corners to be orthogonal to a direction of the camera.

10. The computer-implemented method of claim 8, wherein the fragment processor:
    renders an ellipse instead of the rectangle by:
       defining a texture coordinate $T_i$, that corresponds to each rectangle corner $R_i$,
       wherein the texture coordinates are defined as:

$T_1=(1,1)$ $T_2=(1,-1)$ $T_3=-(1,1)$ $T_4=-(1,-1)$ determining if a pixel should be turned on based on its distance in texture-space, wherein:
          if a length of $T_{xy}$ is greater than one, then the pixel is outside the ellipse, and is not rendered; and
          otherwise, the pixel is rendered.

11. A system for processing a point cloud comprising:
    (a) a computer:
       (1) acquiring the point cloud comprising points;
       (2) encoding and storing, in a point data file, point data for the points by:
          (A) grouping the points into three-dimensional (3D) voxels, wherein each of the points has a corresponding 3D voxel;
          (B) storing, in the point data file, a position of each of the points, wherein the position is with respect to a location of the point's corresponding 3D voxel;
          (C) storing, in the point data file, surface normal data for a surface normal vector associated with each of the points; and
          (D) organizing the points into levels of details (LODs);
    (b) a graphics processing unit (GPU) that processes the point data file to render the point cloud, wherein:
       (1) a LOD is selected to determine the points in the point cloud to render; and (2) the position and the surface normal data are used to render each of the points in the selected LOD;
(c) a vertex shader on the GPU decompressing the point data in the point data file;
(d) a geometry shades on the GPU generating a rectangle in screen-space, based on the decompressed point data, that is to be rendered by a fragment shader, wherein the geometry shader generates the rectangle by:
(1) computing a major axis ($A_{maj}$) of a rectangle that is orthogonal to each point (P) and the surface normal (N) associated with the point (P);
(2) computing a minor axis ($A_{min}$) of the rectangle as a cross product between $A_{maj}$ and N:
(3) determining an angle ($\alpha$) between a camera (C)'s viewing direction and N as $$\cos(\alpha) = \text{normalize}(P-C) \cdot N;$$

where · is a standard inner product between two vectors; and
(4) computing a relative size of the rectangle based on a density of points around the rectangle; and
(e) a fragment processor on the GPU smoothing edges of the rectangle.

12. The system of claim 11, wherein the computer stores the position by:
converting a global position of each point into vectors in a local space of each 3D voxel, wherein the stored position for each of the points is based on the vectors.

13. The system of claim 11, wherein the computer stores the surface normal data by:
computing a mesh of vertices that uniformly covers a unit sphere;
assigning an integer identification (ID) to each of the vertices on the unit sphere;
constructing a look-up table of the assigned integer IDs and corresponding vertices;
determining a vertex from the mesh of vertices that is closest to the surface normal; and
storing the integer ID corresponding to the determined vertex.

14. The system of claim 13, wherein the computer:
reads the point data file;
looks up the integer ID in the look-up table to find the determined vertex; and
utilizes the determined vertex as an output surface normal that is rendered.

15. The system of claim 11, wherein the computer organizes by:
picking, for a first LOD, a first point from the point cloud, wherein the first point is the point that is closest to a center of the corresponding 3D voxel;
recursively, for each LOD:
subdividing the 3D voxel into subdivisions;
selecting points from the point cloud that are closest to centers of the subdivisions;
arranging the selected points in a point array that is sorted by the LOD to which the selected points belong; and
maintaining an index array that identifies indices at which each LOD starts in the point array.

16. The system of claim 11, wherein the vertex shader decompresses by:
for each point:
generating a 3D vector for the surface normal associated with the point;
creating a 3D position;
creating a position of the corresponding 3D voxel for the point;
decompressing color and flag values; and
computing a visibility of each point.

17. The system of claim 11, wherein the geometry shader computes the relative size by:
for each 3D voxel:
transforming each of eight 3D corners $C_i$ of a bounding box of the 3D voxel (V), into normalized device coordinates of the camera (C) as:

$$C_i' = P*V*M*C_i$$

wherein, P, V, and M comprise a projection matrix, a view matrix, and a model matrix;
computing a 2D screen-space size of the 3D voxel as a difference between minimum and maximum values for the transformed points $C_i'$:

$$\text{size}(x) = \max(C_i' \cdot x) - \min(C_i' \cdot x);$$

$$\text{size}(y) = \max(C_i' \cdot y) - \min(C_i' \cdot y);$$

wherein x and y are unit vectors along the X and Y axes;
based on the 2D screen space size, determining how many LODs are needed to fill the 2D screen-space size, as:

$$\text{LOD}_{des} = \log_2\{\max(\text{size}(x), \text{size}(y))\}.$$

18. The system of claim 17, wherein the GPU:
computes a difference between a desired LOD and a maximum LOD of each 3D voxel as:

$$\Delta\text{LOD} = \max(1, \text{LOD}_{des} - \text{LOD}_{max});$$

computes a LOD size factor $\sigma$ as:

$$\sigma = 1/(2^{\Delta\text{LOD}});$$

limits a size of $\sigma$; and
applies the size factor $\sigma$ to axes $A_{min}$ and $A_{maj}$ to get the four corners $R_1 \ldots R_4$ of the rectangle, wherein the four corners of the rectangle are computed as:

$$R_1 = P + \sigma(A_{maj} + A_{min})$$

$$R_2 = P + \sigma(A_{maj} - A_{min})$$

$$R_3 = P - \sigma(A_{maj} + A_{min})$$

$$R_4 = P - \sigma(A_{maj} - A_{min}).$$

19. The system of claim 18, wherein the GPU:
computes a depth value for the point P; and
assigns the depth value to the four corners of the rectangle, wherein the assigning projects the four corners to be orthogonal to a direction of the camera.

20. The system of claim 18, wherein the fragment processor:
renders an ellipse instead of the rectangle by:
defining a texture coordinate $T_i$, that corresponds to each rectangle corner $R_i$, wherein the texture coordinates are defined as:

$$T_1 = (1,1)$$

$$T_2 = (1,-1)$$

$$T_3 = -(1,1)$$

$$T_4 = -(1,-1)$$

determining if a pixel should be turned on based on its distance in texture-space, wherein:

if a length of $T_{xy}$ is greater than one, then the pixel is outside the ellipse, and is not rendered; and otherwise, the pixel is rendered.

\* \* \* \* \*